UNITED STATES PATENT OFFICE.

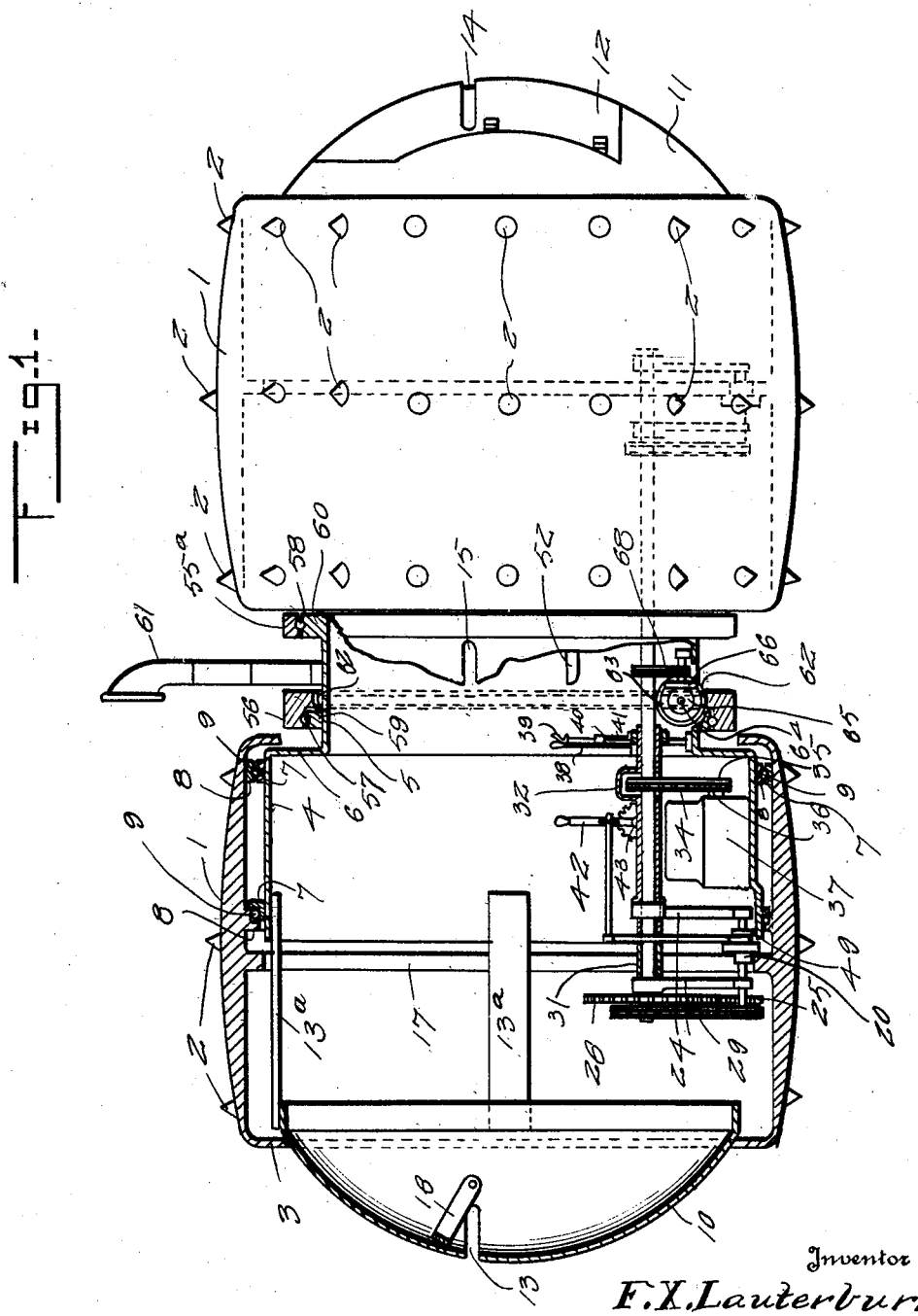

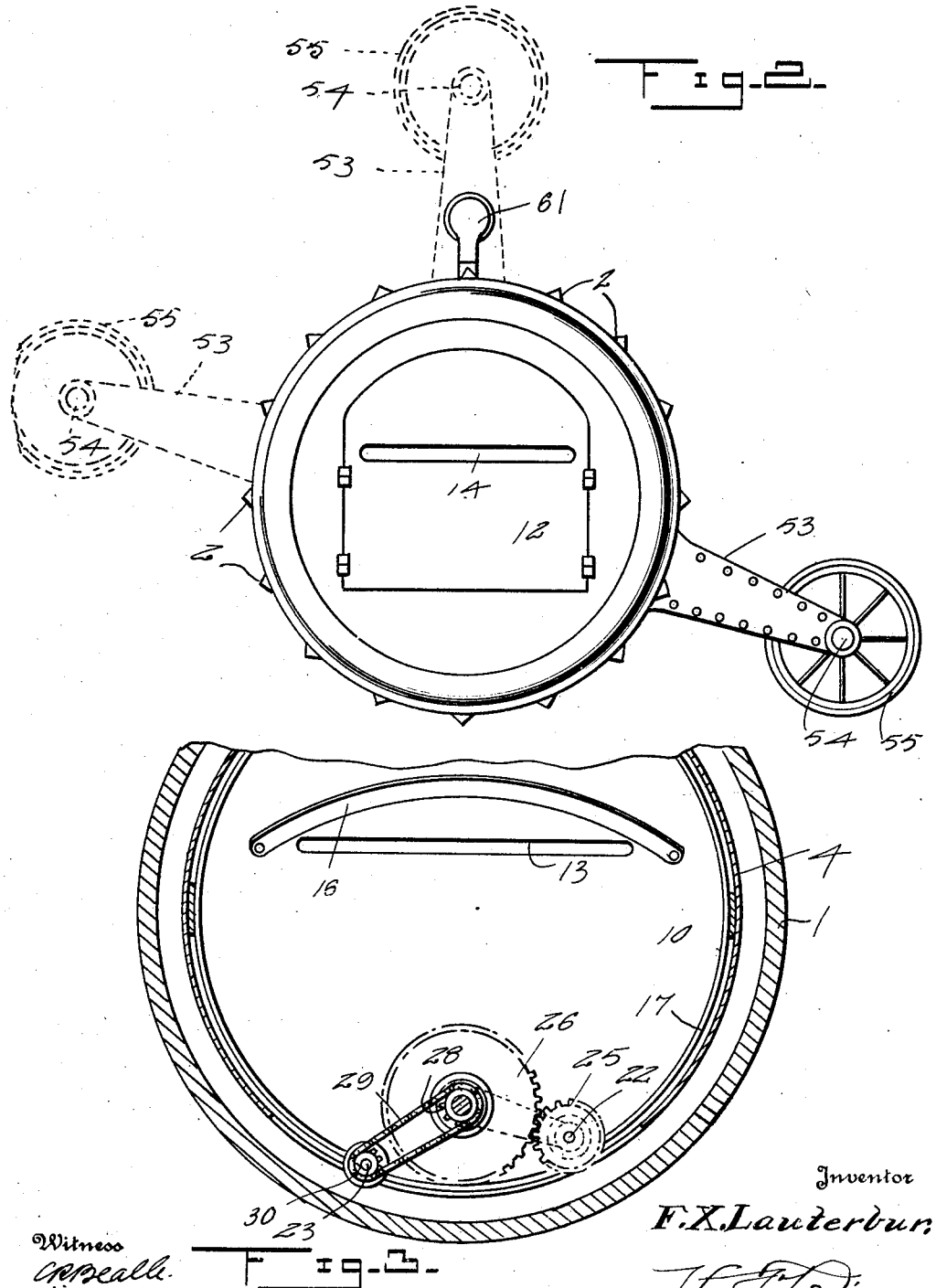

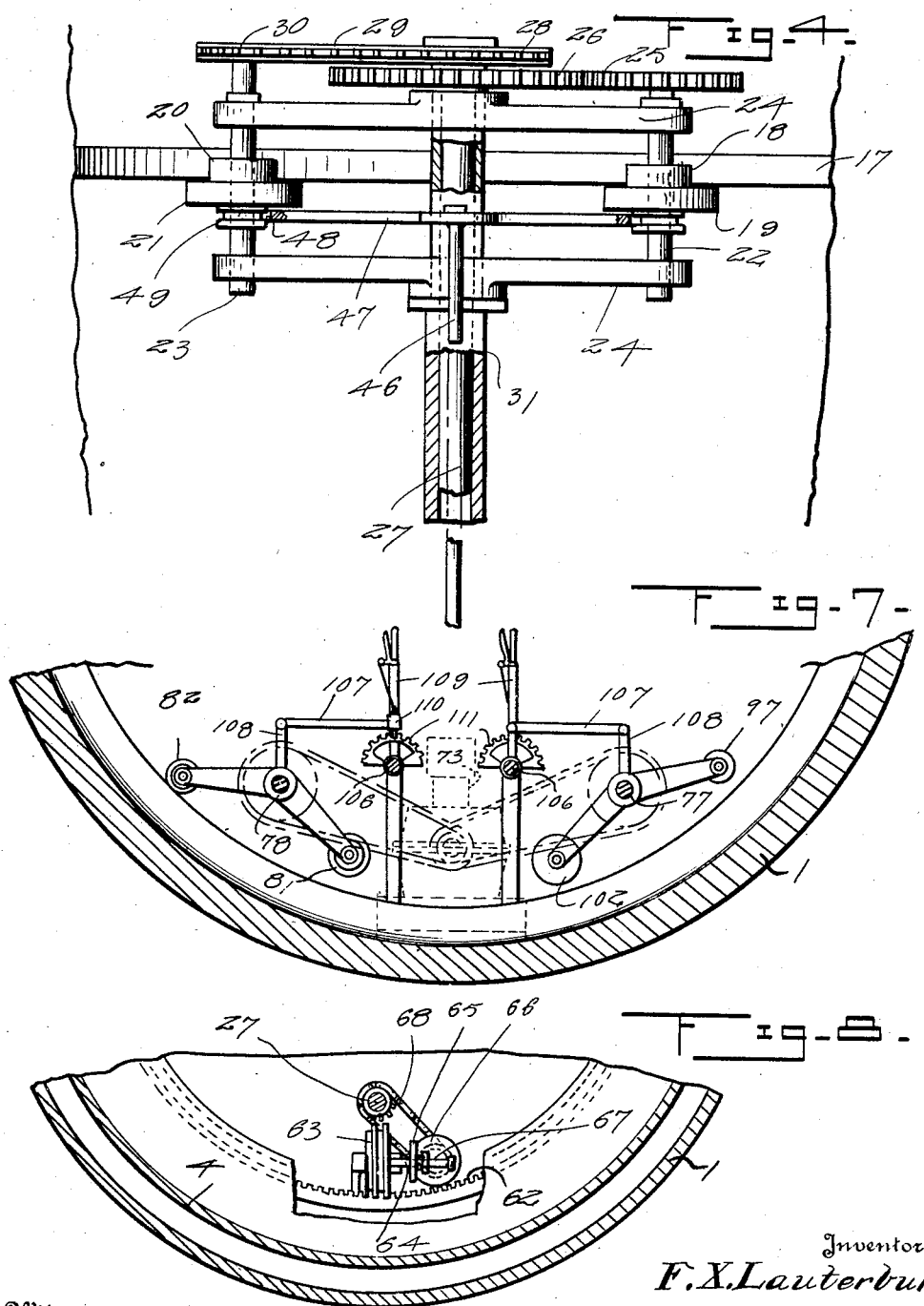

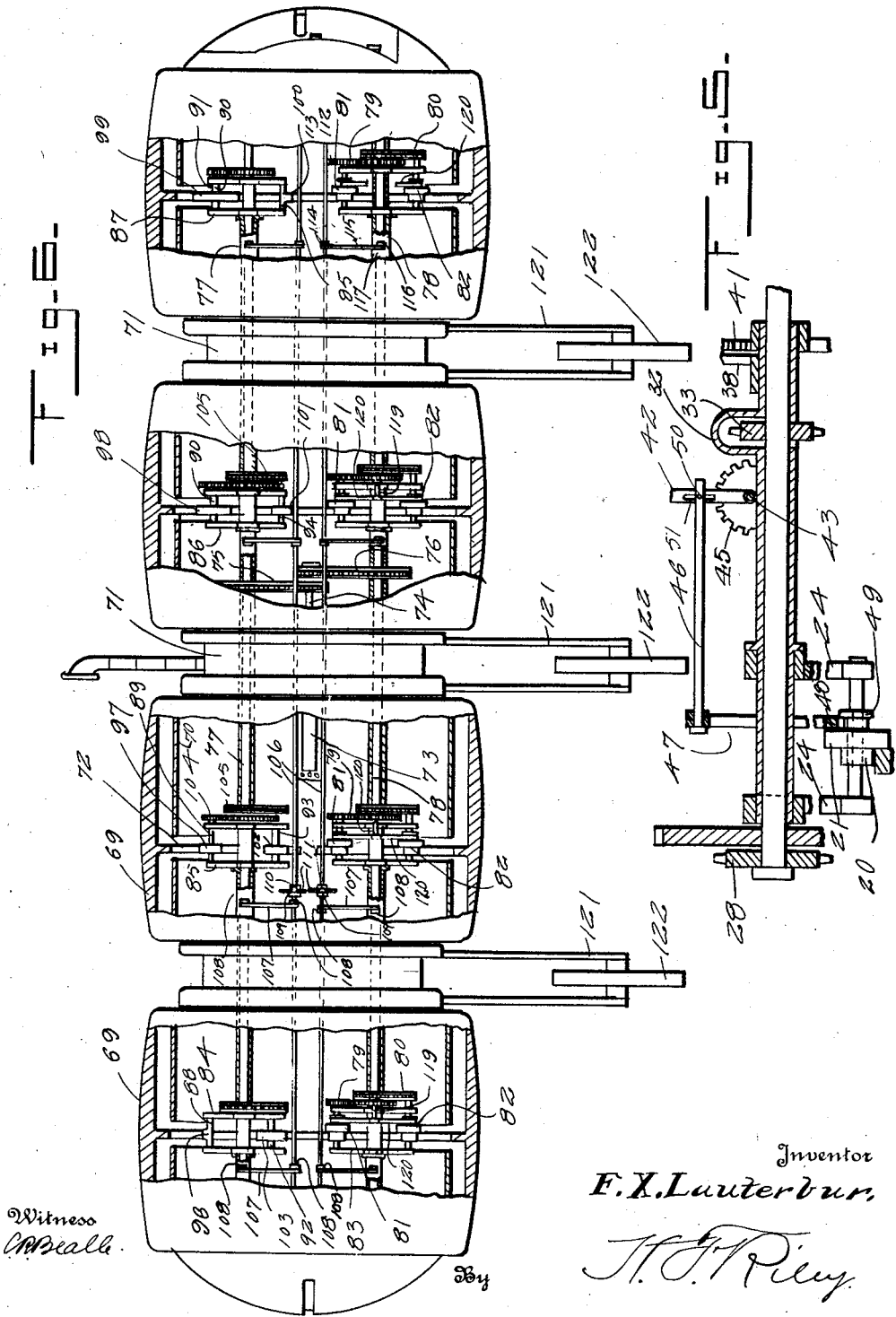

FRANK X. LAUTERBUR, OF SIDNEY, OHIO.

TRACTOR.

1,313,095.  Specification of Letters Patent.  Patented Aug. 12, 1919.

Application filed February 6, 1918. Serial No. 215,607.

*To all whom it may concern:*

Be it known that I, FRANK X. LAUTERBUR, a citizen of the United States, residing at Sidney, in the county of Shelby and State of Ohio, have invented certain new and useful Improvements in Tractors, of which the following is a specification.

The invention relates to improvements in tractors.

The object of the present invention is to improve the construction of tractors and to provide a simple, practical and efficient tractor of comparatively inexpensive construction designed to be employed as a small "tank" for military purposes and adapted to operate either as a unicycle or as a tractor and capable of being easily maneuvered and of being readily operated to cause it to travel either forwardly or rearwardly or to turn practically in the space occupied by it.

It is also an object of the present invention to provide a tractor of this character equipped with a plurality of tractor wheels and an adjustable arm carrying a wheel adapted to be arranged either in advance or in rear of the tractor wheels to run on the ground and coöperate with the tractor wheels for enabling the machine to be driven through contact with the supporting surface and capable also of being maintained in an elevated position for causing the machine to operate on the principle of a unicycle.

Another object of the invention is to enable the arm which carries the wheel to be employed as a lever for assisting the travel of the machine over rough places or up an incline, or the like, and for also enabling power to be applied for changing the relation of the interiorly arranged supporting frame to the arm so that the position of guns within the tractor may be altered to elevate or depress the same to suit the requirements.

Another object of the invention is to enable the center of gravity of the load to be arranged below the axis of rotation of the tractor wheels and close to the ground and to afford a maximum amount of space clear of mechanism for the use of the operator and for the mounting of guns and the like.

With these and other objects in view, the invention also consists in the novel construction, combination and arrangement of the parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Figure 1 is a front elevation partly in longitudinal section of a tractor constructed in accordance with this invention;

Fig. 2 is an end view of the same;

Fig. 3 is a vertical sectional view taken substantially in the plane of one of the internal annular flanges, parts being omitted;

Fig. 4 is an enlarged horizontal plan view partly in section illustrating the construction of the gearing for driving the tractor;

Fig. 5 is a vertical sectional view of the same taken longitudinally of the power shaft;

Fig. 6 is a plan view partly in section illustrating another form of the invention having four tractor wheels;

Fig. 7 is an enlarged sectional view through the lower portion of one of the tractor wheels shown in Fig. 6;

Fig. 8 is a detail view illustrating the construction of the gearing for operating the adjustable pivotally mounted wheel carrying arm.

Like numerals of reference designate corresponding parts in the several figures of the drawings.

In Figs. 1 to 5, inclusive, of the drawings, is illustrated a tractor comprising in its construction a pair of tractor wheels or elements 1 of substantially cylindrical form preferably tapered exteriorly and provided with spurs or projections 2 for enabling them to engage the supporting surface, but any other suitable means may of course be employed for this purpose. The tractor wheels 1 which are provided with inwardly extending annular side flanges 3 are mounted on an inner cylindrical shell or casing 4 constituting a supporting frame and composed of spaced side portions and a reduced central connecting portion 5. The side portions 4 are located within the tractor wheels 1 and are provided at the inner sides of the same with webs or flanges 6 which connect the central and side portions of the inner shell or casing, but the latter may of course be constructed in any other desired manner as will be readily understood. The side portions of the inner shell or casing and the tractor wheels are provided with bearing rings 7 and 8 having grooves or races for anti-friction balls 9 which form ball bearings for suspending the inner shell or casing within the tractor wheels and for connecting the same. Any other suitable form of bearing may of course be employed and while the side portions are shown provided with a pair of ball bearings, any desired number may of course be used and the side flanges 3 form a casing or housing for protecting the ball bearings.

The inner shell or casing preferably terminates at or near the central portions of the tractor wheels and they are equipped with substantially concavo-convex guards or shields 10 and 11 connected by longitudinally disposed bars 13ª with the side portions of the shell or casing, as clearly shown in Fig. 1 of the drawings. The shield or end wall 11 is provided with a door 12 and lookout and machine gun openings 13, 14 and 15 are provided in the shields or end walls 10 and 11 and in the central reduced portion 5 of the inner shell or casing. These openings may be of any desired number and pivoted shutters 16 may be employed or any other suitable means for protecting the occupants of the tractor.

The shields 10 and 11 and the connecting bars 13ª provide an open structure adapted to expose an annular internal flange 17 of each of the tractor wheels. The flange 17 which is designed to be located at or near the center of the tractor wheel constitutes a friction gear element and is designed to be provided with a suitable friction surface to coöperate with friction wheels 18 and 19 of a spur wheel drive and friction wheels 20 and 21 of a sprocket wheel drive, the spur and sprocket gearing enabling the direction of rotation of the tractor wheel to be readily reversed for causing the tractor to travel either forwardly or rearwardly and for also turning the machine by rotating one of the tractor wheels in one direction and the other in the opposite direction. This will enable the tractor to turn practically on a pivot within substantially the space occupied by it. The friction wheels 18 and 19 which form a variable speed transmission or drive may of course be of any desired number and they are slidably interlocked with shafts 22 and 23 which are journaled in spaced sides 24 of a pivoted bearing bracket. The sides 24 are centrally pivoted and have angularly related arms and the said shafts 22 and 23 may be squared or provided with a key or groove for interlocking the slidable friction wheels with the said shafts. A bearing bracket is adapted to be oscillated to swing either a front or rear friction wheel into engagement with the annular internal friction flange of the traction wheel for rotating the latter either forwardly or rearwardly. The gear may be arranged so that either a backward or forward swing of the bearing bracket will drive the tractor either forwardly or rearwardly. As clearly illustrated in Fig. 4 of the drawings, the shaft 22 carries a gear wheel 25 which meshes with a gear wheel 26 of a power shaft 27 and the latter also carries a sprocket wheel 28 keyed or otherwise secured to the shaft 27 and meshing with a sprocket chain 29 which is also arranged on a sprocket wheel 30 suitably fixed to the shaft 23. By this arrangement the shaft 22 is driven in the opposite direction to that of the shaft 27, while the shaft 23 rotates in the same direction as the said shaft 27. The sprocket and the spur gearing are shown located at one side of the pivoted bearing bracket which has its pivot concentric with the shaft 27, but the said gearing may be arranged in any other desired manner and it does not interfere with the pivotal or oscillatory movement of the bearing bracket.

The friction flange 17 is of sufficient radial depth to enable the large friction wheels 19 and 21 to clear the traction wheel when the small friction wheels 18 and 20 are in engagement with the flange 17. The bearing bracket is preferably mounted on a sleeve 31 through which passes the power shaft 27 and which forms a housing or guard for the same and in practice, suitable guards will be provided for the sprocket and spur gearing. The sleeve is provided between its ends with an enlargement 32 which forms a housing for a sprocket wheel 33 and the latter is connected by a chain 34 with a sprocket wheel 35 of the shaft 36 of a motor or engine 37. The motor or engine 37 is connected by silent chain gear with the power shaft which is journaled in suitable bearings. Motion is communicated from the engine 37 to the power shaft 27 which is centrally arranged with respect to the front and back of the lower portions of the traction wheels and motion is communicated from the said power shaft to the shafts 22 and 23 which are continuously rotated when the shaft 27 is actuated. In practice, any suitable form of clutch mechanism may be employed for throwing the power shaft into and out of operation without stopping the engine or motor, but the bearing bracket may of course be arranged in a neutral position with both its front and rear friction wheels out of engagement with the internal friction ring or flange 17 to stop the tractor when desired. This will provide an exceedingly simple control for driving the tractor forwardly or rearwardly or for turning the same in either direction. The sleeve 31 is mounted for partial rotary or pivotal movement and it is equipped with an operating lever 38 suitably secured to the sleeve and provided with a latch lever 39 which is connected with a pawl or dog 40 arranged to engage a toothed segment 41 for securing the sleeve in any of its positions.

The sleeve also has mounted on it an operating lever 42 pivoted at its lower end 43 and arranged adjacent a toothed segment 45 adapted to be engaged by an ordinary pawl or dog (not shown) for securing the lever 42 in its adjustment. The lever 42 is connected by a rod 46 with a yoke 47 having terminal forks 48 for engaging grooves 49 of the hubs of the friction wheels 19 and 21. The rod 46 is shown fixed to the yoke centrally of the same and its outer end carries a suitable fastening device 50 which operates in a slot 51 of the operating lever 42. This construction enables the operating lever to shift the friction wheels to arrange either the large or small friction wheels in position to engage the friction ring or flange 17 and by mounting the operating mechanism of the yoke on the sleeve, the shifting mechanism does not interfere with the pivotal movement of the sleeve and the bearing bracket. In practice, the levers will be arranged in convenient positions with relation to the operator who will preferably occupy a central position in the central reduced connecting portion 5, a centrally arranged seat 52 being indicated. This will enable the operator to control the levers at each side of the tractor.

When motion is communicated to the traction wheels the center of gravity is thrown beyond the base or point of support and the tractor is adapted to operate on the principle of a unicycle, but in order to enable it to operate as a tractor for engaging the supporting surface, it is equipped with a pivoted arm 53 preferably composed of spaced side members carrying a transverse axle 54 at their outer ends and provided at their inner ends with bearing rings 55ª and 56 having ball races for the reception of antifriction balls 57 and 58 which are also arranged in ball races of bearing rings or flanges 59 and 60 mounted on the exterior of the central reduced connecting portion 5 of the inner shell or casing. The anti-friction bearings are spaced apart and the side members of the arm 53 are arranged in spaced relation to enable the arm to clear a periscope 61 and the outlet and machine gun openings 15 of the said central portion 5. The arm 53 is adapted to be swung from the front of the machine to the back thereof when it is desired to change the direction of movement of the tractor and it may be maintained in an elevated position as illustrated in dotted lines of Fig. 2 of the drawings, and it can also be located a short distance above the surface of the ground so that the arm and the wheel 55 carried by the same will be automatically brought into operation should the tractor encounter an obstruction or an inclined surface which would throw the arm downwardly and carry the wheel 55 into contact with the supporting surface and cause the tractor to change its principle of operation and progress by a traction action on the surface of the ground instead of by throwing the center of gravity beyond the base or point of support. This will render the tractor exceedingly effective in maneuvering as the wheel 55 will be normally located above and out of contact with the supporting surface and will not interfere with the rapid turning of the machine in either direction.

The flange 56 is approximately L-shaped in cross section and it has an inwardly extending portion provided with worm teeth 62 forming a worm wheel which meshes with a worm 63 of a shaft 64 journaled in suitable bearings and carrying a friction wheel 65 adjustable on the shaft to engage the face of a friction disk or wheel 66 at either side of the center thereof and at different distances from the center to change the direction of the rotation of the worm shaft and to vary the speed of the same. The friction disk or wheel 66 is mounted on a shaft 67 which is connected by silent chain gearing 68 with the power shaft 27. Any suitable means may be employed for shifting the friction wheel 65 and the gearing for transmitting motion from the power shaft to the worm shaft may be of any desired character as will be readily understood. The worm gearing which is adapted to constitute a lock for the pivoted arm 53 will enable the pivoted arm to be raised and lowered and to be swung from the back to the front of the machine and vice versa, and it will also enable power to be applied to the arm for operating the same as a lever to assist the machine in passing over rough surfaces and also to change the position of relation of the supporting frame to the said arm and to the surface of the ground so that guns carried by the supporting frame may be advantageously positioned by elevating or depressing the same. In practice, the machine will be equipped with a suitable platform for the accommodation of the occupants of the tractor which is particularly designed for use as a small tank and which may be manned by three persons, one at the center and one at either end, but a larger crew may of course be employed and as the mechanism is located at the bottom of the tractor the upper portion of the same will be left entirely clear or free for the use of the occupants and for the mounting of guns and other apparatus and the storing of ammunition and the like. The reducing of the central connecting portion of the inner shell casing not only provides a convenient bearing portion for mounting the pivoted wheel carrying arm, but it also elevates the inner shell or casing sufficiently to clear obstructions so that the same will not come in contact with the inner shell or casing and affect the stability of the same.

Any number of tractor wheels may of course be employed and in Figs. 6 and 7 is illustrated a construction designed to be employed when more than two tractor wheels are used. The machine shown in Fig. 6 is provided with four tractor wheels 69 mounted on an inner shell or casing 70 composed of sections having central reduced portions 71 and arranged to provide openings at the internal friction rings or flanges 72 of the tractor wheels 69. The machine is preferably equipped with a centrally arranged motor or engine 73 which has its shaft 74 connected by silent chain gears 75 and 76 with spaced longitudinally disposed power shafts 77 and 78. The power shaft 78 is adapted to transmit motion to the traction wheels 69 for rotating the same uniformly either forwardly or rearwardly and the said shaft 78 is connected by spur and sprocket gearing 79 and 80 with friction wheels 81 and 82 carried by pivoted bearing frames 83 and adapted to be operated similarly to the friction wheels 18 and 19 and 20 and 21. The friction wheels 81 and 82 are arranged in pairs similar to the friction wheels 18 and 19 and 20 and 21 and they are adapted to be adjusted and operated similarly to those heretofore described and as the construction and operation of the means for shifting the friction wheels 81 and 82 and for tilting the pivoted bearing brackets 83 is the same as that heretofore described in connection with the form of invention shown in Figs. 1 to 5, inclusive, further description of this portion of the mechanism of the machine shown in Fig. 6 is believed to be unnecessary.

The power shaft 77 is designed for use in maneuvering the machine and the latter is equipped with pivoted brackets 84, 85, 86 and 87 composed of spaced sides and carrying front shafts 88, 89, 90 and 91 and rear shafts 92, 93, 94 and 95. The shaft 88 at the left hand bearing bracket 84 is designed to be fixed and to carry a friction shoe 96 for engaging the internal friction flange of the end traction wheel 69. The shafts 89, 90 and 91 of the brackets 85, 86 and 87 are designed to be provided with friction wheels 97, 98 and 99 progressively increasing in diameter from left to right so that when the brackets are tilted forwardly the brake shoe 96 will hold the wheel at the left hand end of the set or series against rotary movement, and motion will be communicated to the other wheels of the series with a progressively increasing speed corresponding with the distance of the rotated wheels from the center of the brake shoe engaged wheel to cause the tractor to turn on the vertical axis of the left hand end wheel. This will enable the machine to make a comparatively short turn and rapidly change its direction of movement.

The shaft 95 is equipped with a brake shoe 100 and the shafts 94, 93 and 92 are equipped with friction wheels 101, 102 and 103 gradually increasing in diameter from right to left so that when the bearing brackets are tilted rearwardly the effect will be exactly the reverse from that produced by tilting the bearing brackets forwardly, the machine turning on the vertical axis of the right hand wheel in a rearward direction. By means of the maneuvering mechanism the machine may be turned to the right or to the left on the axis of one or the other of its end wheels so that a rapid turning of the machine in a comparatively small space is effected by exceedingly simple mechanism.

The rotary shafts of the bearing brackets 84 to 87, inclusive, are connected by spur and sprocket gearing 104 and 105 so that the friction wheels carried by the said shafts will rotate in reverse directions to drive the traction wheels either forwardly or rearwardly. The bearing brackets of the maneuvering or steering mechanism may be connected with any suitable operating mechanism, a rock shaft 106 being shown as one means for accomplishing this result. The rock shaft 106 is provided with arms 107 which are connected by links 108 with the pivoted bearing brackets and it has an operating arm 109 carrying a pawl or dog 110 for engaging a toothed segment 111 for rocking the pivoted bearing brackets of the steering mechanism in any one of its positions to hold the front or rear friction wheels in their engaging position or to maintain them in a neutral position out of engagement with the friction rings or flanges of the traction wheels. The bearing brackets of the propelling mechanism are also preferably operated simultaneously by means of a rock shaft 112 having an operating arm 113 and provided at intervals with arms 114 connected by links 115 with arms or levers 116 of the sleeves 117 of the propelling mechanism. Also the yokes 120 of the propelling mechanism are connected by a rod 119 with a shifting lever similar to that shown in Fig. 1. The shifting lever and the controlling or operating levers are designed to be located so that an operator may conveniently operate the same from a central position. By employing friction gearing in the propelling maneuvering or steering mechanism and also in the means for adjusting the pivoted arm, the speed of the tractor wheels may be varied by varying the pressure on the friction wheels and there will also be no liability of injuring the propelling or maneuvering mechanism or the means for adjusting the arms should such mechanism encounter a resistance as the friction gears will permit the parts to slip without breakage.

The reduced connecting portions 71 of the sections of the inner shell or casing are equipped with pivoted arms 121 which carry wheels 122 and which are mounted and operated similarly to the pivoted arm 53 heretofore described. The gearing for transmitting motion to the tractor wheels is practically silent and will eliminate the necessity of providing a lubricant as it is housed within the machine and protected from dust and dirt.

What is claimed is:

1. A tractor of the class described, including spaced tractor wheels of substantially cylindrical form consisting of hollow rotary casings, an inner casing constituting a supporting frame and provided with external bearings receiving the tractor wheels and housed within the same, said tractor wheels forming continuations of the casing, and means located within the inner casing for transmitting motion to the tractor wheels.

2. A tractor of the class described, including spaced tractor wheels, a casing on which said wheels are journaled, a support suspended within and carried by the wheels and propelling mechanism carried by the support and located within the said wheels and arranged to rotate the tractor wheels in the same direction or in opposite directions, said propelling mechanism including a power shaft extending through the casing.

3. A tractor of the class described, including tractor wheels, a support suspended within the tractor wheels and carried by the same, propelling mechanism mounted on the support and arranged to rotate the tractor wheels in the same or different directions at uniform and different speeds, and a pivoted arm connected with the support and arranged to swing from the back to the front of the tractor to reverse the same and provided with a wheel adapted to run on the ground and to be lifted therefrom to enable the tractor to operate either as a unicycle or as a tractor.

4. A tractor of the class described, including tractor wheels, a support hung within and carried by the wheels, means mounted on the support for rotating the tractor wheels, a pivoted arm connected with the support and provided with a wheel, and operating means connected with the arm for swinging the same to arrange the wheel either in an elevated position or in contact with the ground and also for exerting pressure on the arm for changing the position of the same with relation to the support and for assisting the travel of the tractor, said arm being arranged to swing from the front to the back of the tractor.

5. A tractor of the class described, including spaced approximately cylindrical tractor wheels, a substantially cylindrical support or casing suspended within and carried by the tractor wheels and having a reduced portion located between the tractor wheels, means carried by the support or casing for rotating the tractor wheels and an arm mounted for rotary movement on the reduced portion of the casing or support and provided with a wheel, and means connected with the arm for raising and lowering the same and for swinging the arm over the top of the tractor from one side to the other thereof.

6. A tractor including spaced tractor wheels, a support hung within the tractor wheels, means carried by the support for rotating the tractor wheels, a pivoted arm mounted on the support and provided with a wheel, and gearing connected with the arm for raising and lowering the same and for swinging the arm over the top of the tractor from one side to the other thereof and for forcing the arm against the surface of the ground whereby the arm is caused to operate as a lever.

7. A tractor including spaced tractor wheels, a support hung within the tractor wheels, means carried by the support for rotating the tractor wheels, a pivoted arm mounted on the support and provided with a wheel, a worm wheel connected with the arm, a worm meshing with the worm wheel and swinging the arm from the back to the front of the tractor and for causing the said arm to operate as a lever and a mechanism for actuating the worm.

8. A tractor including spaced tractor wheels, a support hung within the tractor wheels, means carried by the support for rotating the tractor wheels, a pivoted arm mounted on the support and provided with a wheel, a worm wheel connected with the arm, a worm meshing with the worm wheel for swinging the arm and for causing the same to operate as a lever, a motor and friction gearing for transmitting motion from the motor to the worm.

9. A tractor of the class described, including spaced tractor wheels, a support mounted within the wheels and having a cylindrical connecting portion located between the same, an arm provided with a bearing ring mounted on the cylindrical portion of the support and adapted to be rotated to swing the arm upwardly and downwardly and from one side of the tractor to the other, and gearing for rotating the bearing ring and adapted to cause the same to operate as a lever.

10. A tractor of the class described, including spaced tractor wheels, a support mounted within the wheels and having a cylindrical connecting portion located between the same, an arm provided with a bearing ring mounted on the cylindrical portion of the support and provided with worm teeth forming a worm wheel and arranged in spaced relation with the support and gearing carried by the support and including a worm meshing with the worm wheel for swinging the arm.

11. A tractor of the class described, including spaced tractor wheels, a support mounted within the wheels and having a cylindrical connecting portion located between the same, an arm having spaced bearing rings arranged on the cylindrical portion of the support, the latter being provided with bearings receiving the said rings, one of the rings being provided with worm teeth, gearing carried by the support and including a worm for meshing with the said worm teeth for swinging the arm.

12. A tractor of the class described, including spaced substantially cylindrical tractor wheels, a support mounted within the wheels and provided with a reduced connecting portion located between the tractor wheels and having spaced bearings, a periscope carried by the connecting portion of the support and an oscillatory wheel carrying arm having spaced bearing rings mounted on the bearings of the said connecting portion of the support and located at opposite sides of the periscope and arranged to permit the arm to swing past the said periscope in traveling from one side of the tractor to the other.

13. A tractor of the class described, including substantially cylindrical tractor wheels, an approximately cylindrical inner shell or casing receiving the tractor wheels and provided with bearings for the same, said inner shell or casing being provided with end walls or shields located at the outer sides of the tractor wheels, and means carried by the inner shell or casing for rotating the wheels.

14. A tractor of the class described, including spaced approximately cylindrical tractor wheels having inwardly extending annular side flanges, an inner shell or casing extending into the tractor wheels at the inner sides thereof, shields or walls of substantially concavo convex form located at the outer sides of the tractor wheels and connected with the shell or casing, and means mounted on the support for rotating the tractor wheels.

15. A tractor of the class described, including spaced approximately cylindrical tractor wheels, an inner substantially cylindrical shell or casing fitting within the inner portions of the wheels and having the same mounted on it, said inner shell or casing being provided with a reduced connecting portion, concavo convex shields located at the ends of the tractor and fitting within the wheels at the outer sides thereof and a pivoted wheel carrying arm mounted on the reduced portion of the inner shell or casing.

16. A tractor of the class described, including spaced tractor wheels, a support suspended within and carried by the tractor wheels, a wheel carrying arm pivotally mounted on the support between the wheels and arranged to swing from one side of the tractor to the other, separate propelling mechanism carried by the support and arranged to rotate the traction wheels in the same direction or in opposite directions, and gearing also carried by the support and connected with the pivoted arm for actuating the same.

17. A tractor of the class described, including substantially cylindrical tractor wheels, a support suspended within the wheels and connecting the same, said wheels being provided with internal rings forming gear elements, bearing brackets pivotally mounted on the support and located within the said traction wheels and provided with gears arranged to be carried into and out of engagement with the gear elements of the traction wheels, and means for swinging the bearing brackets and for rotating the gears thereof in opposite directions whereby the traction wheels may be rotated in either direction.

18. A tractor of the class described, including approximately cylindrical traction wheels, a support suspended within and connecting the tractor wheels, internal friction rings carried by the tractor wheels, pivoted bearing brackets mounted on the support and provided at opposite sides of their pivots with friction wheels arranged to engage the friction rings of the traction wheels for rotating the same, and means for driving the friction wheels of the brackets in opposite directions.

19. A tractor of the class described, including substantially cylindrical tractor wheels, a support suspended within and connecting the tractor wheels, internal friction rings carried by the tractor wheels, a power shaft, bearing brackets pivoted concentric with the power shaft and provided at opposite sides thereof with friction wheels arranged to engage the friction rings of the traction wheels and spur and sprocket gearing connecting the friction rings with the power shaft for rotating the tractor wheels in either direction.

20. A tractor of the class described, including tractor wheels, a support suspended within the tractor wheels and connecting the same, internal friction rings arranged within the tractor wheels, a power shaft carried by the support, bearing brackets pivoted between their ends at the power shaft, a plurality of friction wheels of different diameters located at each side of the power shaft and mounted on the bearing brackets, gearing connecting the friction wheels with the power shaft for rotating the same in opposite directions, means for swinging the bearing brackets to carry the friction wheels into and out of engagement with the friction rings of the traction wheels, and means for shifting the friction wheels for varying the speed of the tractor wheels.

21. A tractor of the class described, including tractor wheels, a support hung within and connecting the tractor wheels, internal friction rings carried by the tractor wheels, a power shaft, sleeves receiving the power shaft, bearing brackets mounted on the sleeves and extending from opposite sides of the power shaft, friction wheels located at opposite sides of the power shaft and mounted in the bearing brackets and arranged to be carried by the same into and out of engagment with the friction rings, gearing for connecting the friction wheels with the power shaft for rotating the friction wheels in opposite directions, and shifting mechanism mounted on the sleeves for adjusting the friction wheels to vary the speed of the tractor wheels.

22. A tractor of the class described, including tractor wheels, a support hung within and connecting the tractor wheels, internal friction rings carried by the tractor wheels, a power shaft, sleeves receiving the power shaft, bearing brackets mounted on the sleeves and extending from opposite sides of the power shaft, friction wheels located at opposite sides of the power shaft and mounted in the bearing brackets and arranged to be carried by the same into and out of engagement with the friction rings, gearing for connecting the friction wheels with the power shaft for rotating the friction wheels in opposite directions, and shifting mechanism including yokes connecting the friction wheels, shifting levers mounted on the sleeves, and rods extending from the shifting levers to the yokes and connected with the same.

23. A tractor of the class described, including tractor wheels, a support hung within and connecting the tractor wheels, internal friction rings carried by the tractor wheels, a power shaft, sleeves receiving the power shaft, bearing brackets mounted on the sleeves and extending from opposite sides of the power shaft, friction wheels located at opposite sides of the power shaft and mounted in the bearing brackets and arranged to be carried by the same into and out of engagement with the friction rings, gearing for connecting the friction wheels with the power shaft for rotating the friction wheels in opposite directions, shifting mechanism carried by the sleeves and connected with the friction gears for adjusting the same to vary the speed of the traction wheels, and operating mechanism connected with the sleeves for swinging the bearing brackets.

24. A tractor including tractor wheels, a support suspended within and connecting the tractor wheels, propelling mechanism carried by the support and provided with means for rotating the tractor wheels in either direction and steering or maneuvering mechanism provided with means for rotating the tractor wheels at progressively increasing speeds for turning the tractor.

25. A tractor of the class described, including a plurality of alined tractor wheels, a support suspended within and connecting the tractor wheels and maneuvering or steering mechanism including means for holding one of the tractor wheels against rotation and for rotating the other traction wheels at a progressively increased speed to effect a turning of the machine.

26. A tractor of the class described, including a plurality of alined tractor wheels, a support suspended within the wheels and connecting the same, and steering or maneuvering mechanism including means for holding either of the end wheels against rotation and for rotating the rest of the tractor wheels at a progressively increased speed whereby the tractor may be turned in either direction on the vertical axes of the end wheels.

27. A tractor of the class described, including a plurality of alined tractor wheels, a support suspended within and connecting the wheels, internal friction rings carried by the wheels, bearing brackets mounted on the support and pivoted between their ends and provided at opposite sides of the pivot with friction wheels forming two sets or series which progressively increase in diameter from opposite directions, and means for operating the bearing brackets to carry either set of wheels into engagement with the friction rings.

28. A tractor of the class described, including a plurality of alined tractor wheels, a support suspended within and connecting the wheels, internal friction rings carried by the wheels, bearing brackets mounted on the support and pivoted between their ends and provided at opposite sides of the pivot with friction wheels forming two sets or series which progressively increase in diameter from opposite directions, the brackets of the end sprocket wheels being also provided with shoes for engaging the friction rings of the said end tractor wheels for holding the same against rotary movement.

29. A tractor of the class described, including a plurality of alined tractor wheels, a support suspended within and connecting the wheel, internal friction rings carried by the wheels, bearing brackets mounted on the support and pivoted between their ends and provided at opposite sides of the pivot with friction wheels forming two sets or series which progressively increase in diameter from opposite directions, and gearing for rotating the friction wheels in opposite directions, and means connected with the bearing brackets for simultaneously swinging the same to carry the friction wheels into and out of engagement with the friction rings.

30. A tractor including a plurality of alined substantially cylindrical tractor wheels, a support suspended within and connecting the tractor wheels, a motor, power shafts located at opposite sides of the motor and extending longitudinally of the series of traction wheels, internal friction rings carried by the tractor wheels, propelling mechanism comprising pivoted brackets provided with friction wheels connected with one of the power shafts and arranged to engage the friction rings for rotating the traction wheels at a uniform speed in either direction, and steering or maneuvering mechanism comprising pivotally mounted bearing brackets having friction wheels of progressively increasing diameter and arranged to engage the friction rings for rotating the traction wheels at different speeds for effecting a turning of the tractor, and means for connecting with power shafts with the motor.

31. A tractor of the class described, including a plurality of alined tractor wheels, a support hung within the tractor wheels and connecting the same and provided with reduced portions located between the tractor wheels, a plurality of adjustable wheel carrying arms pivotally mounted on the reduced portions of the support, and means for raising and lowering the same and for swinging the arms over the tractor to either side thereof.

32. A tractor of the class described, including a plurality of substantially cylindrical tractor wheels, an inner shell or casing suspended within and connecting the tractor wheels and forming a support, and means carried by the support and having a power shaft extending through the casing for rotating the tractor wheels in the same or in different directions and at either uniform or different speeds.

33. A tractor of the class described, provided with a pivoted arm extending in the rear of the tractor and provided with a wheel adapted to run on the ground, and means for swinging the said arm from the back to the front of the tractor to reverse the tractor and for also swinging the arm to an elevated position to enable the tractor to operate as a unicycle, said means also operating to force the arm against the surface of the ground for causing the arm to operate as a lever.

In testimony whereof I affix my signature in the presence of two witnesses.

FRANK X. LAUTERBUR.

Witnesses:
P. R. TAYLOR,
MERRILL BLACK.

Copies of this patent may be obtained for five cents each, by addressing the "Commissioner of Patents, Washington, D. C."